US007578170B2

(12) United States Patent
Mayer et al.

(10) Patent No.: US 7,578,170 B2
(45) Date of Patent: Aug. 25, 2009

(54) INSTRUMENT AND METHOD FOR DETECTING AND REPORTING THE SIZE OF LEAKS IN HERMETICALLY SEALED PACKAGING

(75) Inventors: Daniel W. Mayer, Wyoming, MN (US); Timothy A. Ascheman, Elk River, MN (US)

(73) Assignee: Mocon, Inc., Minneapolis, MN (US)

( * ) Notice: Subject to any disclaimer, the term of this patent is extended or adjusted under 35 U.S.C. 154(b) by 28 days.

(21) Appl. No.: 11/815,060

(22) PCT Filed: Dec. 13, 2005

(86) PCT No.: PCT/US2005/045132

§ 371 (c)(1),
(2), (4) Date: Jul. 30, 2007

(87) PCT Pub. No.: WO2006/083400

PCT Pub. Date: Aug. 10, 2006

(65) Prior Publication Data

US 2008/0092635 A1      Apr. 24, 2008

Related U.S. Application Data

(60) Provisional application No. 60/649,296, filed on Feb. 2, 2005.

(51) Int. Cl.
*G01M 3/32* (2006.01)
(52) U.S. Cl. ........................................ 73/49.3
(58) Field of Classification Search ............ 73/40, 73/49.3, 861; 53/403
See application file for complete search history.

(56) References Cited

U.S. PATENT DOCUMENTS

| 3,101,613 A | 8/1963 | Kuntz |
| 3,466,925 A | 9/1969 | Ziegehagen et al. |

(Continued)

FOREIGN PATENT DOCUMENTS

DE      4212938 A1      10/1993

(Continued)

OTHER PUBLICATIONS

Hanson, et al., "In Quest of Sterile Packaging: Part 1, Approaches to Package Testing", Medical Device & Diagnostic Industry, Aug. 1995, pp. 56-61.

(Continued)

*Primary Examiner*—John Fitzgerald
(74) *Attorney, Agent, or Firm*—Sherrill Law Offices, PLLC

(57) ABSTRACT

An instrument for detecting leaks in a hermetically sealed package. The instrument includes (i) a hollow needle, (ii) a mass flow rate sensor in sealed fluid communication with the lumen defined by the hollow needle, and (iii) a vacuum pump. The vacuum pump is in fluid communication with the lumen defined by the needle for evacuating gas from the hermetically sealed package, and in fluid communication with the mass flow rate sensor for directing mass flow from the evacuated package into operable contact with the mass flow rate sensor so as to permit sensing of any continuing mass flow from the evacuated package. The instrument may further include an oxygen sensor, also in sealed fluid communication with the lumen defined by the hollow needle for analyzing the oxygen concentration of the gas within the hermetically sealed package.

2 Claims, 4 Drawing Sheets

U.S. PATENT DOCUMENTS

| | | | |
|---|---|---|---|
| 3,498,110 A | 3/1970 | Burn | |
| 3,555,884 A | 1/1971 | Yamamoto et al. | |
| 3,561,254 A | 2/1971 | Argaud et al. | |
| 3,633,416 A | 1/1972 | Van Dyke et al. | |
| 3,636,751 A | 1/1972 | Pasini, III et al. | |
| 3,672,207 A | 6/1972 | Cramp et al. | |
| 3,762,212 A | 10/1973 | Morley et al. | |
| 3,849,070 A | 11/1974 | Garza et al. | |
| 3,855,531 A * | 12/1974 | Fielibert et al. | 324/693 |
| 3,922,525 A | 11/1975 | Kozak et al. | |
| 3,952,580 A | 4/1976 | Bennett | |
| 3,956,923 A | 5/1976 | Young et al. | |
| 4,067,239 A | 1/1978 | Arvisenet | |
| 4,104,905 A | 8/1978 | Zachary | |
| 4,105,138 A | 8/1978 | Lehmann, deceased et al. | |
| 4,133,736 A | 1/1979 | Nakagawa et al. | |
| 4,145,916 A | 3/1979 | Bott et al. | |
| 4,268,967 A | 5/1981 | Brana et al. | |
| 4,424,708 A | 1/1984 | Meuleman | |
| 4,555,934 A | 12/1985 | Freeman et al. | |
| 4,561,289 A | 12/1985 | Jones | |
| 4,593,554 A | 6/1986 | Aarts | |
| 4,622,643 A | 11/1986 | Dotson | |
| 4,627,270 A | 12/1986 | Jones | |
| 4,643,019 A | 2/1987 | Jones | |
| 4,671,100 A | 6/1987 | Doussiet | |
| 4,715,212 A | 12/1987 | Johanson | |
| 4,747,299 A | 5/1988 | Fox et al. | |
| 4,750,918 A | 6/1988 | Sirkar | |
| 4,774,830 A | 10/1988 | Hulsman | |
| 4,791,806 A | 12/1988 | Wade | |
| 4,852,415 A | 8/1989 | Bogatzki et al. | |
| 4,899,574 A | 2/1990 | Potteiger | |
| 4,922,746 A | 5/1990 | Hulsman et al. | |
| 4,934,180 A | 6/1990 | Hulsman | |
| 4,991,574 A | 2/1991 | Pocknell | |
| 5,042,291 A | 8/1991 | Lehmann | |
| 5,149,105 A | 9/1992 | Beaver et al. | |
| 5,150,605 A | 9/1992 | Simpson | |
| 5,156,329 A | 10/1992 | Farrell | |
| 5,163,315 A | 11/1992 | Asai et al. | |
| 5,203,822 A | 4/1993 | Gurich et al. | |
| 5,212,993 A | 5/1993 | Mayer | |
| 5,226,316 A | 7/1993 | Mally et al. | |
| 5,285,678 A | 2/1994 | McDaniel et al. | |
| 5,307,696 A | 5/1994 | Allain et al. | |
| 5,319,957 A | 6/1994 | Stieger et al. | |
| 5,332,008 A | 7/1994 | Todd et al. | |
| 5,333,491 A | 8/1994 | Lehmann | |
| 5,345,814 A | 9/1994 | Cur et al. | |
| 5,365,774 A | 11/1994 | Horlacher | |
| 5,404,747 A | 4/1995 | Johnston et al. | |
| 5,433,120 A | 7/1995 | Boyd et al. | |
| 5,497,654 A | 3/1996 | Lehmann | |
| 5,499,529 A | 3/1996 | Kronberg et al. | |
| 5,513,516 A | 5/1996 | Stauffer | |
| 5,564,306 A | 10/1996 | Miller | |
| 5,570,694 A | 11/1996 | Rometsch | |
| 5,591,899 A | 1/1997 | Griesbeck | |
| 5,728,929 A | 3/1998 | Gevaud | |
| 5,777,203 A | 7/1998 | Stymne | |
| 5,831,147 A | 11/1998 | Hoath | |
| 5,850,036 A | 12/1998 | Giromini | |
| 5,891,076 A | 4/1999 | Fabo | |
| 5,915,270 A | 6/1999 | Lehmann | |
| 5,919,476 A | 7/1999 | Fischer et al. | |
| 5,939,619 A | 8/1999 | Achter et al. | |
| 6,018,987 A | 2/2000 | Mayer et al. | |
| 6,050,133 A | 4/2000 | Achter et al. | |
| 6,139,801 A | 10/2000 | Kawachi et al. | |
| 6,189,223 B1 | 2/2001 | Haug | |
| 6,308,556 B1 | 10/2001 | Sagi et al. | |
| 6,324,926 B1 | 12/2001 | Lehtinen et al. | |
| 6,354,138 B1 | 3/2002 | Ascheman et al. | |
| 6,382,011 B1 | 5/2002 | Mayer et al. | |
| 6,450,011 B1 | 9/2002 | Mayer et al. | |
| 6,450,012 B1 | 9/2002 | Mayer et al. | |
| 6,460,405 B1 | 10/2002 | Mayer et al. | |
| 6,609,414 B2 | 8/2003 | Mayer et al. | |
| 6,935,199 B2 | 8/2005 | Wickland et al. | |
| 6,981,403 B2 | 1/2006 | Ascheman et al. | |
| 7,252,014 B1 | 8/2007 | Mayer et al. | |
| 2002/0069691 A1 | 6/2002 | Roberts et al. | |
| 2003/0084957 A1 | 5/2003 | Seitz et al. | |
| 2006/0011237 A1 | 1/2006 | Tison et al. | |
| 2007/0266773 A1 | 11/2007 | Mayer et al. | |
| 2007/0289390 A1 | 12/2007 | Ascheman | |

FOREIGN PATENT DOCUMENTS

| | | |
|---|---|---|
| EP | 0445002 A2 | 4/1991 |
| EP | 0646781 | 4/1995 |
| EP | 0883744 B1 | 2/1997 |
| EP | 09904793 A2 | 9/1998 |
| GB | 2311865 A | 4/1997 |
| JP | 57127830 A * | 8/1982 |
| JP | 2122234 A | 5/1990 |
| JP | 6201432 | 7/1994 |
| WO | 2006/076110 A2 | 7/2006 |
| WO | 2006/083400 A2 | 8/2006 |

OTHER PUBLICATIONS

Jones, et al., "In Quest of Sterile Packaging: Part 2, Physical Package Integrity Test Methods", Medical Device & Diagnostic Industry, Sep. 1995, pp. 81-85.

Arndt, George W. Jr., "Examination of Containers for Integrity", Bacteriological Analytical Manual Online, Jan. 2001, pp. 1-31., United States Food & Drug Administration.

* cited by examiner

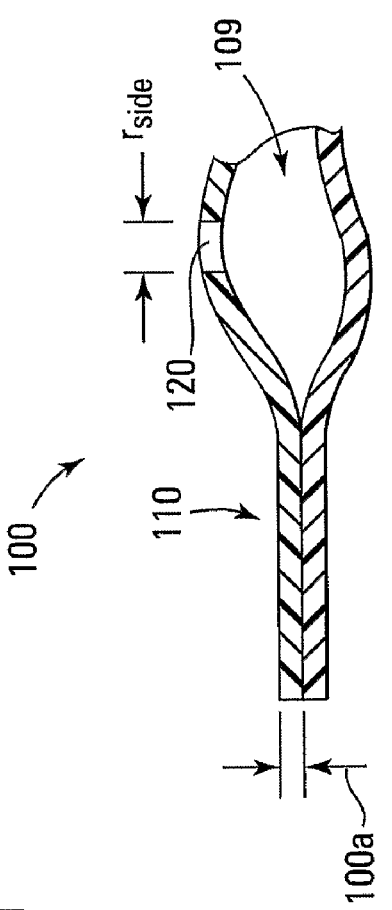
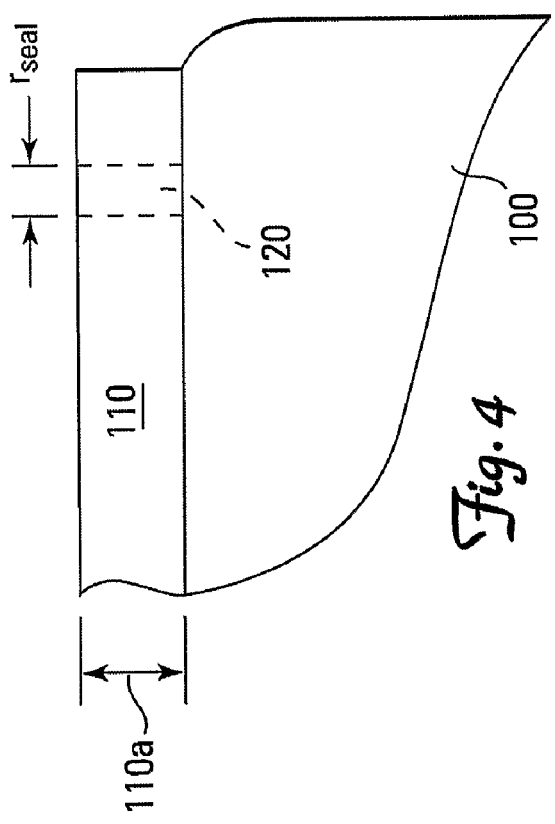

INSTRUMENT AND METHOD FOR DETECTING AND REPORTING THE SIZE OF LEAKS IN HERMETICALLY SEALED PACKAGING

FIELD OF INVENTION

The invention relates to instruments and techniques for detecting leaks in hermetically sealed packaging.

BACKGROUND

Products susceptible to spoilage, such as processed foods, nuts and sliced fruits and vegetables, are often placed in hermetically sealed packaging which has been flushed with an inert gas, such as nitrogen or argon, to achieve an oxygen concentration within the packaging of less than about 3% and thereby prolong the shelf-life of the product. Such packaging is commonly known as controlled atmosphere packaging (CAP) or modified atmosphere packaging (MAP).

Leaks in the packaging can significantly reduce the anticipated shelf life, resulting in undesired spoilage. Hence, proper quality control efforts for CAP/MAP typically involve at least periodic testing of packaging to determine if the packaging has any leaks.

A variety of instruments and methods are known for detecting leaks in hermetically sealed packaging. Leak detection typically involves the creation of a pressure differential between the pressure inside the packaging (internal pressure) and the pressure outside the packaging (external pressure)— such as by compressing the packaging or pulling a vacuum in the atmosphere surrounding the packaging, followed by the detection of any change in a given variable which could be correlated to the presence of a leak in the packaging. Specific examples include submersion of the packaging into a liquid and detecting any liquid within the packaging (U.S. Pat. No. 6,763,702 issued to Allen Chien et al.), squeezing of the packaging and detecting of any pressure decay (U.S. Pat. No. 6,427,524 issued to Frank Raspante et al.), squeezing the packaging and detecting any volume decay (U.S. Pat. No. 5,533,385 issued to William Frievalt) and placing the packaging within a vacuum chamber and detecting any loss of vacuum (U.S. Pat. No. 5,150,605 issued to Edwin Simpson).

While each of these instruments and techniques are generally effective for detecting leaks in hermetically sealed packaging, a substantial need continues to exist for a quick, easy, inexpensive and accurate instrument and technique for detecting leaks in hermetically sealed packaging. A need also exists for such an instrument which could provide some indication of the size and/or location of the leak.

SUMMARY OF THE INVENTION

A first aspect of the invention is an instrument for detecting and reporting the size of a leak in hermetically sealed packaging. The instrument includes (A) a needle having a lumen, (B) a vacuum pump, (C) a mass flow rate sensor, (D) a first pressure sensor operative for sensing an external pressure on the hermetically sealed packaging and transmitting an external pressure signal, (E) a second pressure sensor for sensing pressure within the retention chamber defined by the packaging and transmitting an internal pressure signal, (F) a display device, (G) a user input device, (H) a memory device, and (I) a processor. The needle is operable for perforating the hermetically sealed packaging so as to place the lumen of the needle in fluid communication with a retention chamber defined by the packaging. The vacuum pump is in fluid communication with the lumen defined by the needle for evacuating gaseous content from the hermetically sealed packaging to form an evacuated retention chamber. The mass flow rate sensor is in sealed fluid communication with the lumen defined by the needle for sensing a mass flow rate pulled through the lumen from the evacuated retention chamber by the vacuum pump and transmitting a mass flow rate signal. The memory device receives and stores a value for the fluid viscosity of the external gas, a value for the packaging wall thickness, and a value for at least one packaging seal length. The processor is interconnected and programmed to receive the mass flow rate signal, receive the external pressure signal, receive the internal pressure signal, communicate with the memory device to obtain the fluid viscosity value, packaging wall thickness value and packaging seal length value, calculate a first hole size value for a hole through the packaging wall utilizing Pouseuill's Law and the value for the packaging wall thickness, calculate a second hole size value for a hole through at least one seal utilizing Pouseuill's Law and the value for at least one seal length, and display at least one of the first and second hole size values.

A second aspect of the invention is a computerized method for detecting a leak in hermetically sealed packaging and reporting the size of the leak. The method includes the steps of (A) perforating the hermetically sealed packaging so as to place a lumen in fluid communication with a retention chamber defined by the packaging, (B) evacuating a gaseous content from the retention chamber through the lumen so as to form an evacuated retention chamber, (C) sensing mass flow rate through the lumen from the evacuated retention chamber, (D) sensing an external pressure of a gas surrounding the evacuated retention chamber, (E) sensing an internal pressure within the evacuated retention chamber, (F) inputting into electronic memory (i) a fluid viscosity value for the external gas, (ii) a value for the thickness of the packaging walls, and (iii) a value for the length of at least one seal, (G) calculating a first hole size value of a hole through the packaging wall from the sensed and input values utilizing Pouseuill's Law and the value for the thickness of the packaging walls, (H) calculating a second hole size value of a hole through at least one seal from the sensed and input values utilizing Pouseuill's Law and the value for the length of at least one seal, and (I) reporting at least one of the first and second hole size values.

BRIEF DESCRIPTION OF THE DRAWINGS

FIG. 4 is an enlarged top view of one corner of a hermetically sealed packaging with a hole through the seal.

FIG. 5 is an enlarged cross-sectional side view of one end of a hermetically sealed packaging with a hole through the packaging wall.

DETAILED DESCRIPTION OF THE INVENTION INCLUDING A BEST MODE

Figure 1:
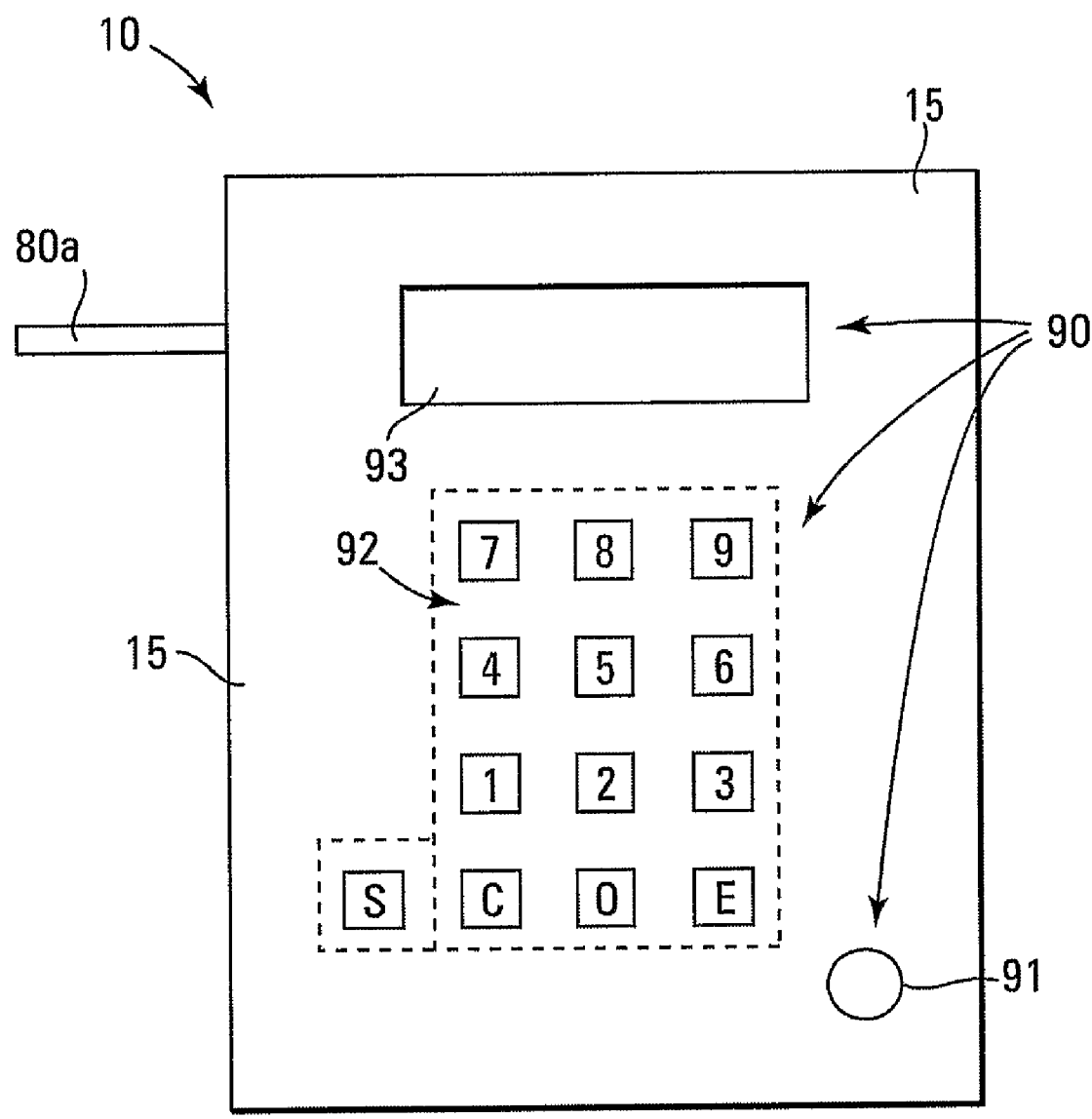
FIG. 1 is a front view of one embodiment of the invention depicted with an evacuated flexible packaging.

Nomenclature
10 Instrument
15 Housing
16 Inlet Port Through the Housing 17 Outlet Port Through the Housing
18 Access Port Through the Housing
20 Needle
21 Distal End of Needle
29 Lumen of Needle
31 First Pressure Sensor
32 Second Pressure Sensor
40 Vacuum Pump
50 Mass Flow Rate Sensor
60 Processor
65 Memory
70 Collective Reference to Leads 70a, 70b, 70c and 70d.
70a Lead from the First Pressure Sensor to the Processor
70b Lead from the Second Pressure Sensor to the Processor
70c Lead from the Vacuum Pump to the Processor
70d Lead from the Mass Flow Rate Sensor to the Processor
71 Leads from the Processor to the Battery
80 Collective Reference to Tubing 80a, 80b and 80c
80a Length of Tubing Interconnecting the Needle and the First Pressure Sensor
80b Length of Tubing Interconnecting the First Pressure Sensor and the Vacuum Pump
80c Length of Tubing Interconnecting the Vacuum Pump and the Mass Flow Rate Sensor
81 Length of Tubing from the Mass Flow Rate Sensor to the Exit Port through the Housing
82 Length of Tubing from the Second Pressure Sensor to the Access Port through the Housing
90 User Interface Components
91 Power Button
92 Data Entry Device
93 Display Device
100 Packaging
100a Thickness of Packaging Wall
101 Solids Content of Packaging
102 Gaseous Content of Packaging
109 Retention Chamber Defined by Packaging
110 Packaging Seal
110a Length of Packaging Seal
120 Hole in Packaging
200 Septum
300 Battery
$r_{seal}$ Radius of Hole Through the Packaging Seal
$r_{side}$ Radius of Hole Through the Packaging Sidewall
C Clear Button
E Enter Button
S Start Button Definitions As utilized herein, including the claims, the phrase "hole size" means the cross-sectional area of a hole or opening. Hole size may be reported as area (e.g., cm$^2$ or in$^2$) or may be reported as a variable from which area may be calculated (e.g., radius of a circle (area=($\pi$) (radius$^2$), diameter of a circle (area=($\pi$) (diameter/2)$^2$), length of a side of a square (area=length$^2$), length of a side of an equilateral triangle (area=((length$^2$)/4) (square root of 3), etc.

As utilized herein, including the claims, Poiseuille's Law refers to the mathematical equation set forth below which was developed by the French physician Jean Poiseuille to describe the rate of flow of a fluid through a tube based upon the diameter, length and pressure drop along the tube.

$$R=[(\pi)(r^4)(P_1-P_2)]/(8 \mu L)$$

Where: R=rate of flow
r=inside radius of the pipe
$P_1$=pressure at one end of the pipe
$P_2$=pressure at the other end of the pipe
$\mu$=viscosity of the fluid flowing through the pipe
L=length of the pipe Poiseuille's Law can be meaningfully adapted to calculate an approximation of the size of a hole through packaging by assuming that the hole is a tube with a substantially uniform lumen and equating each of the variables in the equation as set forth below.
R=rate of flow through the hole
r=radius of the hole
$P_1$=pressure outside the packaging
$P_2$=pressure inside the packaging
$\mu$=viscosity of the fluid flowing into the packaging through the hole
L=length of the hole Structure As shown in FIGS. 1 and 2, a first aspect of the invention is an instrument 10 for detecting and reporting the size of a leak in hermetically sealed packaging 100.

The instrument 10 can be effectively employed with a wide variety of hermetically sealed packaging 100 ranging from rigid packaging such as poly vinyl chloride tubes, through semi-flexible packaging such as wax-coated cartons and thin-walled polyethylene bottles, to flexible packaging such as bags made from polyethylene terephthalate (i.e., MYLAR®) or polyethylene films.

Figure 2:
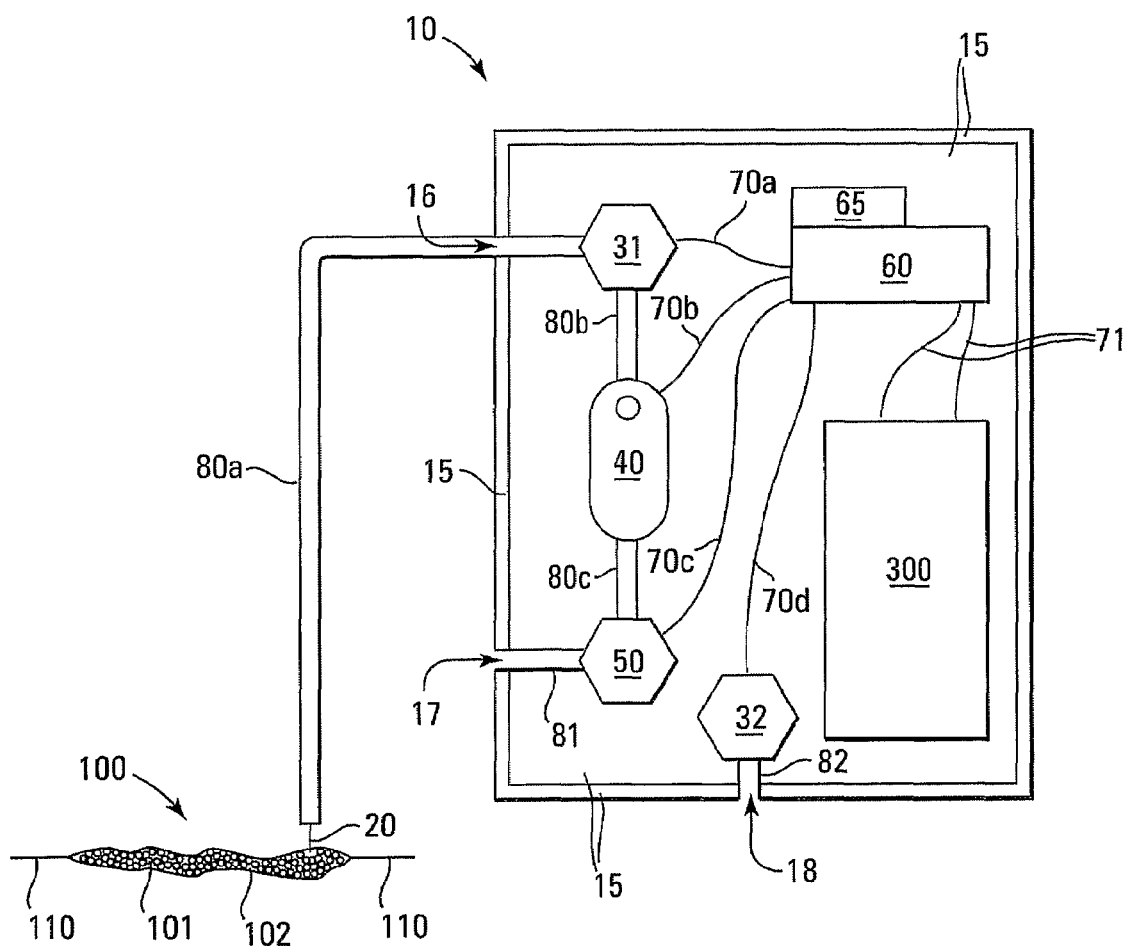
FIG. 2 is a front view of the invention shown in FIG. 1 with the cover of the housing removed to facilitate viewing of the internal components.

Referring to FIGS. 1 and 2, the first aspect of the instrument 10 includes a needle 20, a first pressure sensor 31, a second pressure sensor 32, a vacuum pump 40, a mass flow rate sensor 50, and a processor 60 with memory 65. Appropriate tubing 80a, 80b, and 80c (hereinafter collectively referenced as tubing 80) sequentially interconnect the needle 20, first pressure sensor 31, vacuum pump 40, and mass flow rate sensor 50, respectively. Appropriate electrical leads 70a, 70b, 70c and 70d (hereinafter collectively referenced as electrical leads 70) electrically connect the processor 60 to the first pressure sensor 31, the second pressure sensor 32, the vacuum pump 40, and the mass flow rate sensor 50, respectively.

Figure 3:
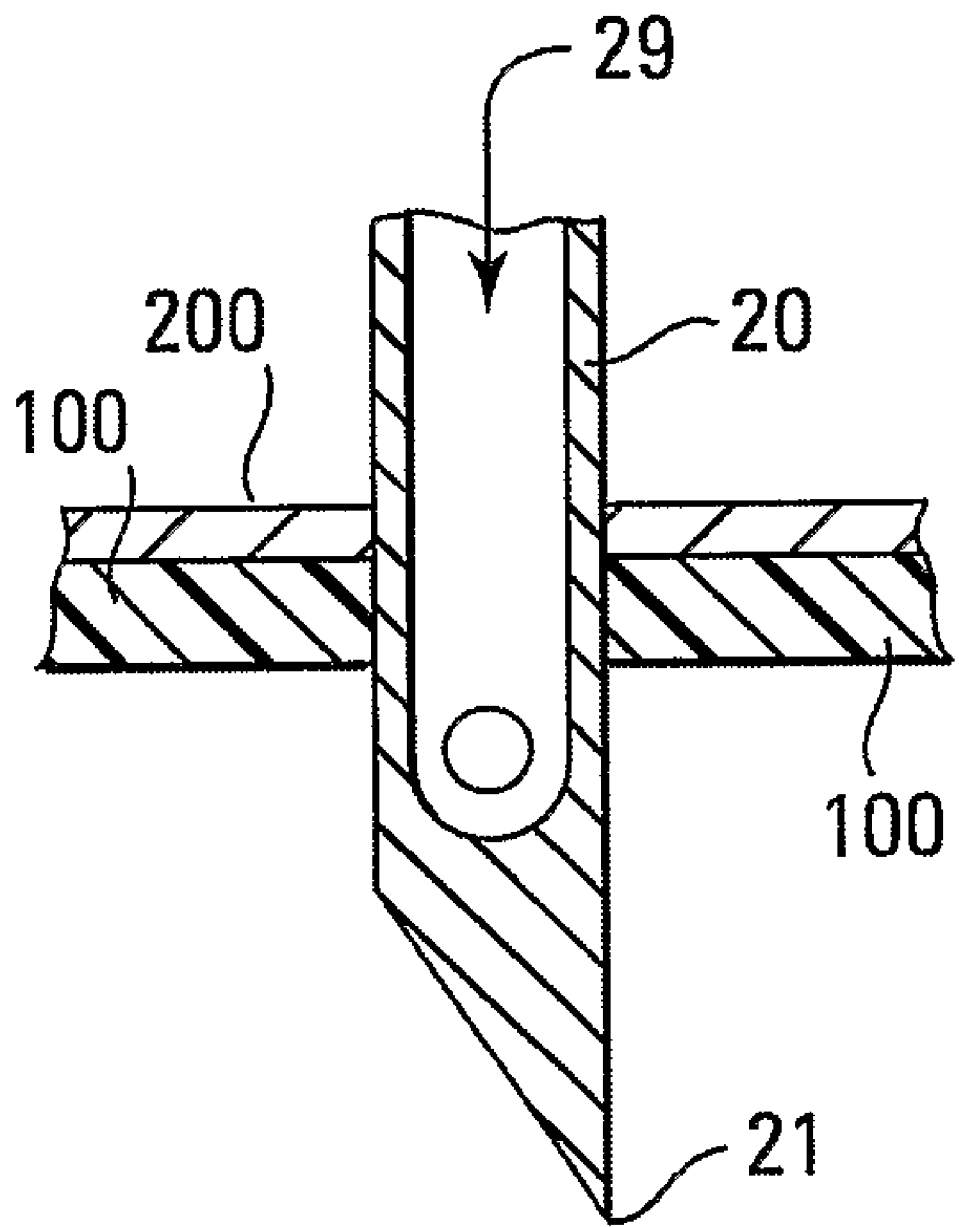
FIG. 3 is an enlarged cross-sectional side view of the distal end of the needle shown in FIG. 1.

As shown in FIG. 3, the needle 20 is configured and arranged with a lumen 29 and a sharp pointed distal end 21 effective for piercing a sidewall (unnumbered) of the packaging 100. A septum 200 is preferably adhered to the sidewall of the packaging 100—especially when the packaging 100 is highly flexible—prior to piercing of the packaging 100 with the needle 20 in order to maintain a hermetic seal around the needle 20.

Referring to FIG. 2, a vacuum pump 40 is sealingly connected to the lumen 29 of the needle 20 by tubing 80. Once the needle 20 has been inserted through packaging 100, operation of the vacuum pump 40 is effective for evacuating the gaseous content 102 from the retention chamber 109 defined by the packaging 100 through the lumen 29 of the needle 20 and creating a vacuum within the retention chamber 109.

Substantially any type of vacuum pump 40 is suitable for use in the instrument 10, with selection dependent primarily upon choice of power source (i.e., battery or electrical power lines), desired level of portability (i.e., hand-held or desktop), and intended use (i.e., testing of large volume or small volume packaging). For most applications, a vacuum pump 40 with a maximum gas volumetric flow rate of about 250 to 1,000 cm$^3$/minute and capable of pulling a maximum vacuum of about 1-15 lb/in$^2$, preferably 4-8 lb/in$^2$, using standard consumer batteries (e.g., AAA, AA, A, C, D or 9-volt batteries) will be sufficient.

Referring to FIG. 2, a first pressure sensor 31 is employed between the needle 20 and the vacuum pump 40 for measuring and reporting the pressure within the evacuated retention chamber 109. The internal pressure sensed by the first pressure sensor 31 after the gaseous content 102 has been evacuated from the retention chamber 109 and a steady state vacuum has been established within the retention chamber 109 is the value "$P_2$" (pressure inside the packaging) in Poiseulle's Law.

Referring again to FIG. 2, a second pressure sensor 32 is employed to measure and report the atmospheric pressure surrounding the outside of the packaging 100. The external pressure sensed by the second pressure sensor 32 is the value "$P_1$" (pressure outside the packaging) in Poiseulle's Law.

A cost-effective alternative to employing the second pressure sensor 32 is to utilize the first pressure sensor 31 to sense both the internal and external pressures by taking a pressure reading with the first pressure sensor 31 while the lumen 29 defined by the needle 20 is still in fluid communication with the surrounding environment (i.e., before the needle 20 is inserted into the packaging 100).

As shown in FIG. 2, a mass flow rate sensor 50 is positioned downstream from the vacuum pump 40 for measuring the mass flow rate pulled from the evacuated retention chamber 109 by the vacuum pump 40. The mass flow rate sensor 50 may alternatively be positioned upstream from the vacuum pump 40. The mass flow rate of interest is the mass flow rate measured after the gaseous content 102 has been evacuated from the retention chamber 109 and a steady state vacuum has been established within the retention chamber 109. The mass flow rate measured at this stage is the value of "R" (rate of flow through the hole) in Poiseulle's Law.

Suitable gas mass flow rate sensors 50 for use in the instrument 10 are available from a number of sources, including MKS Instruments of Wilmington, Mass.

Referring to FIG. 2, the first pressure sensor 31, second pressure sensor 32, vacuum pump 40, and mass flow rate sensor 50 are operably interconnected to a microcontroller or processor 60 by appropriate leads 70 for controlling operation of the various components, and receiving and processing the data signals generated by the various sensors. The processor 60 is connected to a suitable power source, such as a battery 300, by electrical leads 71. These components, along with the associated electrical leads 70, tubing 80 and a power source such as a battery 300, are preferably retained within a single housing 15 which is equipped with (i) an inlet port 16 configured and arranged to attach to a length of tubing 80a in order to place the needle 20 into fluid communication with the components retained within the housing 15, (ii) an outlet port 17 attached by a length of tubing 81 to the mass flow rate sensor 50 for venting gas pumped from the retention chamber 109 by the vacuum pump 40, and (iii) an access port 18 attached by a length of tubing 82 to the second pressure sensor 32 for placing the second pressure sensor 32 into sensible contact with the surrounding atmosphere.

Referring to FIG. 1, the front face (unnumbered) of the housing 15 includes the necessary an appropriate user interface components 90 including (i) a power ON/OFF switch 91, (ii) a data entry device 92, such as a number pad, and (iii) a display device 93, such as an LCD screen. The data entry device 92 and display device 93 are operably interconnected to the microcontroller or processor 60.

As shown in FIG. 2, the microcontroller or processor 60 includes associated memory 65 for storing data values received from the various sensors 31, 32 and 50, and values input through the data entry device 92.

The microcontroller or processor 60 is programmed to query a user for (i) the viscosity of the fluid surrounding the evacuated packaging 100—typically air—which will be utilized as the value "$\mu$" in Poiseulle's Law, (ii) the thickness 100a of the material from which the packaging 100 is constructed—which will be utilized as a first or sidewall leak value "L" (length of the hole) in Poiseulle's Law, and (iii) the length 110a of a seal 110 in the packaging 100—which will be utilized as a second or seal leak value of "L" (length of the hole) in Poiseulle's Law. The microcontroller or processor 60 is further programmed to receive data values for (i) the pressure outside the packaging 100 from the second pressure sensor 32—which will be utilized as the value "$P_1$" in Poiseulle's Law, (ii) the pressure inside the packaging 100 from the first pressure sensor 31—which will be utilized as the value "$P_2$" in Poiseulle's Law, and (iii) the mass flow rate through the hole 120 from the mass flow rate sensor 50—which will be utilized as the value "R" in Poiseulle's Law. After receiving these values, the microcontroller or processor 60 then calculates a radius "r" for a hole 120 through the sidewall of the packaging 100 (hereinafter $r_{side}$) utilizing Poiseulle's Law and the first or sidewall leak value of "L", and calculate a radius "r" for a hole 120 through the seal 110 of the packaging 100 (hereinafter $r_{seal}$) utilizing Poiseulle's Law and the second or seal leak value of "L". One or both of the calculated "r" values $r_{side}$ and $r_{seal}$ are then reported. In appropriate circumstances, one or both of the calculated "r" values can be discarded as extraneous as the calculated value is unrealistic—such as may occur when no leak exists and the value of "R" used in the calculation results in unrealistically small numbers for both $r_{side}$ and $r_{seal}$, a leak exists in the sidewall of the packaging 100 and the calculation utilizing the second or seal leak value "L" results in an unrealistically small number for $r_{seal}$, or a leak exists in a packaging seal 110 and the calculation utilizing the first or sidewall leak value "L" results in an unrealistically large number for $r_{side}$. When both $r_{side}$ and $r_{seal}$ are unrealistically small numbers the microcontroller or processor 60 can be programmed to report NO LEAK DETECTED.

The instrument 10 may be constructed as a portable or desktop unit.

Use

A unit of packaging 100 having a solids content 101 and a gaseous content 102 is selected for analysis. The power switch 91 is depressed to activate the instrument 10 and the START button S is depressed. The instrument 10 displays sequential requests for the user to input values for the viscosity of the fluid surrounding the evacuated packaging 100, the thickness 100a of the material from which the packaging 100 is constructed, and the length 110a of a seal 110 in the packaging 100, utilizing the data entry device 92. As an alternative the processor 60 may be preprogrammed with the viscosity of fluids which are commonly encountered as the "atmospheric" gas during such testing, such as air, nitrogen and helium, and the instrument 10 may simply display a menu of these fluid types from which the user may select. After receiving the requested data, the instrument 10 directs the user to insert the needle 20 into the test packaging 100.

A septum 200 is optionally adhered to the outer surface (unnumbered) of the packaging 100. The septum 200 and packaging 100 are perforated by the distal end 21 of the needle 20 a sufficient distance to place the lumen 29 into fluid communication with the retention chamber 109 defined by the packaging 100. The needle 20 is then left in the inserted position for the balance of the procedure.

The user then initiates analysis by again pressing the START button S. The vacuum pump 40 is activated to evacuate the gaseous content 102 from the retention chamber 109 defined by the packaging 100 and pull a vacuum. The first pressure sensor 31, second pressure sensor 32, and mass flow rate sensor 50 are activated to sense the internal pressure, external pressure and mass flow rate through the tubing 80 once the gaseous content 102 has been evacuated from the retention chamber 109 and the pressure within the retention camber 109 has reached steady state. Once these values have been sensed and transmitted to the processor 60, the pressure sensors 31 and 32, the vacuum pump 40 and the mass flow rate sensor 50 may be deactivated.

The processor 60 then utilizes the input and sensed values for fluid viscosity ($\mu$), sidewall thickness ($L_{side}$), seal length ($L_{seal}$), external pressure ($P_1$), internal pressure ($P_2$) and mass flow rate (R) to calculate a hole size (r) for each of $r_{side}$ and $r_{seal}$ using Poiseulle's Law.

One or both of the calculated "r" values $r_{side}$ and $r_{seal}$ are then reported. In appropriate circumstances, one or both of the calculated "r" values can be discarded as extraneous as the calculated value is unrealistic—such as may occur when no leak exists and the value of "R" used in the calculation results in unrealistically small numbers for both $r_{side}$ and $r_{seal}$, a leak exists in the sidewall of the packaging 100 and the calculation utilizing the second or seal leak value "L" results in an unrealistically small number for $r_{seal}$, or a leak exists in a packaging seal 110 and the calculation utilizing the first or sidewall leak value "L" results in an unrealistically large number for $r_{side}$. When both $r_{side}$ and $r_{seal}$ are unrealistically small numbers the microcontroller or processor 60 can be programmed to report NO LEAK DETECTED.

It is noted that in the event the packaging 100 has multiple holes 120 through the packaging sidewall or multiple holes 120 through the packaging seal 110, a single aggregate hole size will be reported (e.g., packaging with two different holes 100 through the packaging seal 110 having radii of 2 mm and 3 mm respectively would be reported as a single packaging seal leak having a radius $r_{seal}$ of 3.15 mm). However, in the relatively rare event that the packaging 100 has at least one hole 120 through the sidewall and at least one hole through the seal 110, the existence of a hole 120 will be reported but the reported hole size will often be off as the mass flow rate R through both types of holes 120 is sensed as a single value and this single value employed within Poiseuille's Law as though the entire mass flow rate is passing through a hole 120 of a single length L (e.g., either the length L of the sidewall or the length L of the seal 110) when in actuality the length L of the hole 120 through the sidewall will typically be several orders of magnitude smaller than the length L of the hole 120 through the packaging seal 110.

The testing procedure can then be repeated by pressing the CLEAR button C followed by pressing the START button S.

We claim:

1. An instrument comprising:
(a) a needle having a lumen operable for perforating a hermetically sealed packaging so as to place the lumen of the needle in fluid communication with a retention chamber defined by the packaging;
(b) a vacuum pump in fluid communication with the lumen defined by the needle effective for evacuating gaseous content from the hermetically sealed packaging to form an evacuated retention chamber;
(c) a mass flow rate sensor in sealed fluid communication with the lumen defined by the needle for sensing a mass flow rate pulled through the lumen from the evacuated retention chamber by the vacuum pump and transmitting a mass flow rate signal;
(d) a first pressure sensor operative for sensing an external pressure on the hermetically sealed packaging and transmitting an external pressure signal;
(e) a second pressure sensor for sensing pressure within the retention chamber defined by the packaging and transmitting an internal pressure signal,
(f) a display device;
(g) a user input device;
(h) a memory device for receiving and storing
(1) a value for the fluid viscosity of the external gas,
(2) a value for the packaging wall thickness, and
(3) a value for at least one packaging seal length; and
(i) a processor interconnected and programmed to (1) receive the mass flow rate signal, (2) receive the external pressure signal, (3) receive the internal pressure signal, (4) communicate with the memory device to obtain the fluid viscosity value, packaging wall thickness value and packaging seal length value, (5) calculate a first hole size value for a hole through the packaging wall utilizing Poiseuille's Law and the value for the packaging wall thickness, (6) calculate a second hole size value for a hole through at least one seal utilizing Poiseuille's Law and the value for at least one seal length, and (7) display at least one of the first and second hole size values.

2. A method comprising the steps of:
(a) perforating a hermetically sealed packaging so as to place a lumen in fluid communication with a retention chamber defined by the packaging;
(b) evacuating a gaseous content from the retention chamber through the lumen so as to form an evacuated retention chamber;
(c) sensing mass flow rate through the lumen from the evacuated retention chamber;
(d) sensing an external pressure of a gas surrounding the evacuated retention chamber;
(e) sensing an internal pressure within the evacuated retention chamber;
(f) inputting into electronic memory (1) a fluid viscosity value for the external gas, (2) a value for the thickness of the packaging walls, and (3) a value for the length of at least one seal;
(g) calculating a first hole size value of a hole through the packaging wall from the sensed and input values utilizing Poiseuille's Law and the value for the thickness of the packaging walls;
(h) calculating a second hole size value of a hole through at least one seal from the sensed and input values utilizing Pouseuill's Law and the value for the length of at least one seal; and
(i) reporting at least one of the first and second hole size values.

* * * * *